(12) United States Patent
Lagares Carrasco et al.

(10) Patent No.: US 8,393,579 B2
(45) Date of Patent: Mar. 12, 2013

(54) SYSTEM FOR DISCONNECTING A FUEL TRANSFER BOOM

(75) Inventors: Francisco Jose Lagares Carrasco, Madrid (ES); Andres Molina Cano, Madrid (ES)

(73) Assignee: Eads Construcciones Aeronauticas, Madrid (ES)

( * ) Notice: Subject to any disclaimer, the term of this patent is extended or adjusted under 35 U.S.C. 154(b) by 185 days.

(21) Appl. No.: 12/804,106

(22) Filed: Jul. 14, 2010

(65) Prior Publication Data

US 2011/0168844 A1    Jul. 14, 2011

(30) Foreign Application Priority Data

Jan. 8, 2010   (ES) .................................. 201030008

(51) Int. Cl.
*B64D 39/00*   (2006.01)
(52) U.S. Cl. ................. 244/135 A; 244/135 R
(58) Field of Classification Search .............. 244/135 R, 244/135 A; 137/355.24, 315.01; 414/694, 414/723; 141/382, 392
See application file for complete search history.

(56) References Cited

U.S. PATENT DOCUMENTS

| | | | | |
|---|---|---|---|---|
| 2,617,050 A | * | 11/1952 | Weinfurt | 310/21 |
| 3,128,009 A | * | 4/1964 | Norton | 220/316 |
| 3,140,730 A | * | 7/1964 | Costes | 376/203 |
| 5,108,252 A | * | 4/1992 | Gilmore et al. | 414/694 |
| 6,725,584 B2 | * | 4/2004 | Inoue et al. | 37/468 |
| 7,469,863 B1 | * | 12/2008 | Speer | 244/135 A |
| 2010/0274444 A1 | * | 10/2010 | Williamson et al. | 701/34 |
| 2011/0168844 A1 | * | 7/2011 | Lagares Carrasco et al. | 244/135 |

* cited by examiner

*Primary Examiner* — Timothy D Collins
*Assistant Examiner* — Medhat Badawi
(74) *Attorney, Agent, or Firm* — Paul Bogdon

(57) ABSTRACT

System (10) for disconnecting the nozzle (1) of a boom from a receptacle (2) to which the nozzle (1) is connected for fuel transfer, comprising latches (3) which are situated in the nozzle (1) and engage with latch-pins (5) arranged in the said receptacle (2), characterized in that the system (10) comprises a receptacle disconnection system (20) which operates the latch-pins (5) of the receptacle (2) and a nozzle disconnection system (30) which operates the latches (3) of the nozzle (1) such that, when an operator performs normal disconnection of the nozzle (1), the system (10) sends a first signal (21) to the receptacle (2) so that its latch-pins (5) are retracted in order to release the latches (3) of the nozzle (1) and, in parallel, sends a second signal (31) to the nozzle (1) so that the latches (3) of the nozzle (1) are retracted and release the said nozzle (1).

12 Claims, 3 Drawing Sheets

SYSTEM FOR DISCONNECTING A FUEL TRANSFER BOOM

FIELD OF THE INVENTION

The present invention relates to a system for performing the disconnection of a boom used for refuelling or fuel transfer. More particularly it relates to a system for performing the disconnection of a telescopic boom used during in-flight refuelling and fuel transfer between a tanker aircraft and a receiver aircraft.

PRIOR ART

One of the methods which is used nowadays for refuelling or fuel transfer operations comprises a telescopic boom which comprises in turn a fixed part and a movable part, said movable part being able to extend telescopically with respect to the fixed part, thereby performing fuel transfer from one tank to another.

In the particular case of in-flight fuel transfer between a tanker aircraft and a receiver aircraft, this telescopic boom is usually operated by an operator or "boomer" who is on-board the tanker aircraft and guides said telescopic boom until its end, or nozzle, connects to the receptacle of the receiver aircraft. The end of the boom or nozzle has latches, these latches in turn comprising stops. On the other hand, the receptacle of the receiver aircraft has latch-pins, which are normally operated hydraulically, these latch-pins being intended to fix and lock the nozzle of the telescopic boom by means of the latches provided thereon. Once the nozzle is connected to the receptacle, the boomer is able to start performing transfer of fuel from the tanker aircraft to the receiver aircraft in a safe manner.

Once refuelling has been completed, it is required to perform disconnection of the telescopic boom from the receiver aircraft. Said disconnection is generally performed by means of the boomer on the tanker aircraft who performs normal disconnection consisting in sending, by means of an electrical signal, a command to the latch-pins of the receptacle so that they release the latches of the telescopic boom which are keeping the end thereof engaged inside the receptacle of the receiver aircraft. Thus, the latch-pins are retracted, releasing the latches on the nozzle of the telescopic boom. The time which is needed for the end of the telescopic boom to be released completely from the receptacle varies depending on the type and characteristics of the said receptacle and may be as long as one second. During this time, the boomer must not retract or move the telescopic boom since this would pull the receiver aircraft along with it. Once the nozzle has been completely released, the boomer may then start to retract the telescopic boom.

Occasionally, it is required to perform an emergency disconnection of the telescopic boom from the receptacle, for example in cases where a component develops a fault either in the receptacle or in the tanker aircraft equipment, as, for example, in the case where the system for releasing the nozzle latches fails.

In situations such as those described above, in addition to the normal disconnection system mentioned previously, an emergency disconnection system is also provided, these two disconnection systems being independent of each other. This emergency disconnection system allows the boomer of the tanker aircraft to extract the telescopic boom from the receptacle of the receiver aircraft. This emergency disconnection operation is performed by means of the boomer who sends a command in the form of an electrical signal such that the latches on the nozzle of the telescopic boom move and the end of the telescopic boom is released, even though the latch-pins on the receptacle have failed to operate, thereby allowing the boomer to start retracting the said boom. Typically, the displacement of these latches is performed by means of pneumatic cylinders operated by means of pressurized-gas bottles.

The problem posed by these systems is that they can be used in-flight only a limited number of times since the gas bottles must be replenished or replaced either at certain intervals or, for safety reasons, before each flight mission of the tanker aircraft. Moreover, the use of these pressurized-gas bottles means that the telescopic boom must be modified in order to house said cylinders, this resulting in a considerable increase in the maintenance costs. Furthermore, it may happen that in certain locations where the tanker aircraft must land no pressurized gas is available for replenishing the said bottles, which means that the tanker aircraft has to fly without being able to rely on an emergency disconnection system.

The document U.S. Pat. No. 6,725,584 discloses a system for rapidly connecting and disconnecting the arm of an excavator or other machine, which comprises latch-type members which, as required, lock or release the front arm by means of rotation thereof about pins. The document U.S. Pat. No. 5,108,252 also discloses a system which enables rapid disconnection of an excavator arm using disconnection devices which are activated remotely. Neither of these systems concerns the sector relating to the in-flight refuelling of aircraft.

The document to U.S. Pat. No. 4,438,793, which is considered to be the prior art document closest to the invention, discloses a system which allows emergency disconnection of the end of a telescopic boom used during in-flight refuelling of aircraft. In this system, the boomer on the tanker aircraft directly operates latches which are arranged on the end of the telescopic boom by means of an electrically operated solenoid comprising a coil. Thus, the boomer activates the coil such that the current passing through it causes the latches to be displaced and releases the end of the telescopic boom so that the boom can then be rapidly disconnected. A problem which is posed by the system such as that described is that the boomer has to activate said system when an emergency situation is detected, this delaying disconnection during operations which are per se highly dangerous. A further problem, in addition to those which arise with a system such as that described in U.S. Pat. No. 4,438,793, is that sometimes the boomer, after activating the solenoid in order to release the latches retaining the telescopic boom, starts to retract said boom even though, in certain cases, due to a fault or delay of some kind, the latches have not yet moved and have not freed movement of the boom end. As a result, when the boomer starts to retract the boom, the receptacle and, together with it, the associated receiver aircraft are pulled along by the boom.

The object of the present invention is to solve the aforementioned problems.

BRIEF DESCRIPTION OF THE INVENTION

Thus, the present invention relates to a system which performs disconnection of a boom used for refuelling or fuel transfer, in particular a telescopic boom used during in-flight refuelling and fuel transfer between a tanker aircraft and a receiver aircraft.

The disconnection system according to the invention in turn comprises:
 a receptacle disconnection system;
 a nozzle disconnection system, which acts in parallel with the receptacle disconnection system, whenever normal disconnection of the nozzle is performed; and an independent disconnection system, which acts directly and independently of normal nozzle disconnection.

The disconnection system according to the invention is arranged in the tanker aircraft and operates the telescopic boom of said aircraft, in particular operating the nozzle of the said telescopic boom where fuel transfer between the two aircraft actually takes place.

The telescopic boom operated by the system according to the invention comprises a nozzle or end part which is that which must be connected inside the receptacle of the receiver aircraft so that fuel can be transferred between the two aircraft. The nozzle of the telescopic boom comprises a housing which in turn comprises undercuts inside which latches are arranged, said latches comprising stops provided on its ends closest to the receptacle of the receiver aircraft. The front latches, and consequently the undercuts in the housing of the nozzle, are situated diametrically opposite each other. Moreover, two solenoid systems, i.e. a primary system and independent system, are installed inside the housing of the nozzle.

In turn, the receptacle of the receiver aircraft is provided with a secondary solenoid system which comprises a secondary coil as well as a system of latch-pins intended to keep the latches of the nozzle locked or fixed by means of their stops, such that the nozzle is correctly connected inside the receptacle and fuel can be transferred from one aircraft to another. When the boomer performs normal disconnection, with the system according to the invention both the receptacle disconnection system and the nozzle disconnection system are operated in parallel, as will be described below.

Thus, when the boomer performs normal disconnection, on the one hand an electrical signal is sent to the primary solenoid system of the nozzle, said primary solenoid system comprising a primary coil which, when passed through by said electrical current, creates a magnetic field which induces a current in the secondary coil arranged in the receptacle of the receiver aircraft; when current is induced in this secondary coil, the receptacle starts to move its latch-pins which therefore start to release the latches on the nozzle (receptacle disconnection system).

Moreover, in parallel with that described above, when the boomer performs normal disconnection, an electrical signal is also sent at the same time to the independent solenoid system of the nozzle. When this solenoid system is excited, the latches on the nozzle are then operated so that they start to move and are retracted inside the undercuts of the boom housing which are provided for this purpose, thereby starting to release the nozzle (nozzle disconnection system). Since this electrical signal is sent directly to the nozzle, it starts to operate the nozzle disconnection system more rapidly than the receptacle disconnection system, such that the nozzle latches start to retract before the receptacle latch-pins.

Moreover, owing to operation in parallel of both the receptacle disconnection system and the nozzle disconnection system, the response time achieved according to the invention—which is defined by the time lapsing between the moment when the boomer performs normal disconnection of the system and release of the nozzle so as to allow safe retraction of the receptacle—is much shorter than that which occurs in the known systems, since it is possible to start retracting the telescopic boom before the receptacle latch-pins have been completely retracted.

In addition to the shorter response time, with the system according to the invention disconnection of the nozzle from the receptacle is performed much more safely than in the known systems, since it is performed by means of two systems, i.e. a receptacle disconnection system and a nozzle disconnection system, these two systems furthermore operating two different components within the system, i.e. the nozzle on the one hand and the receptacle on the other hand.

The disconnection system according to the invention in turn comprises a fault detection system which detects possible faults when normal disconnection is performed, permanently checking that the disconnection system is operative.

Furthermore, the disconnection system according to the invention also comprises an independent disconnection system which is separate from the receptacle disconnection system and nozzle disconnection system described above. Thus, by means of this independent disconnection system, the boomer is able to perform, at any time and directly (without any intermediate means between the signal given and activation of the nozzle), disconnection and consequently independent retraction of the nozzle (in the case of an emergency, for example). When the boomer activates the independent disconnection system, an electrical signal is sent directly to the independent solenoid system of the nozzle. When this system is activated, the nozzle latches are then operated so that they start to move, being retracted inside the undercuts of the boom housing which are provided for this purpose, thus releasing the nozzle so that it may be safely disconnected from the receptacle of the receiver aircraft.

Moreover, the disconnection system according to the invention comprises a sensor which indicates whether the nozzle is released inside the receptacle and can be safely retracted.

Other characteristic features and advantages of the present invention will become clear from the detailed description which follows with reference to the accompanying figures.

DETAILED DESCRIPTION OF THE INVENTION

Figure 1:
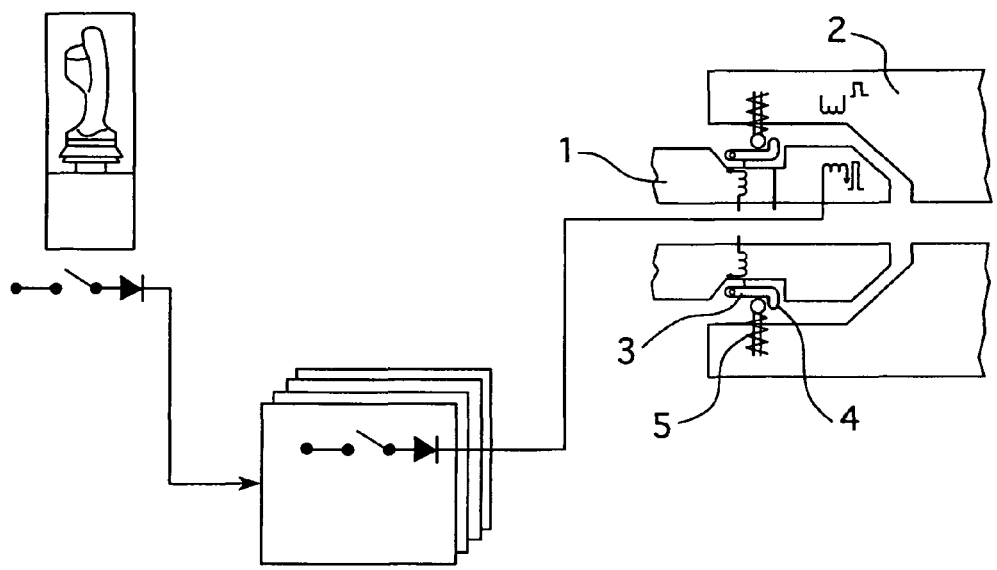
FIG. 1 shows in schematic form a normal disconnection system according to the known prior art, when the boom nozzle is engaged inside the receptacle.

As shown in FIG. 1, according to the prior art, in-flight transfer of fuel between a tanker aircraft and a receiver aircraft is performed by means of a telescopic boom which is operated by a boomer who is on-board the tanker aircraft and guides the said telescopic boom until its nozzle 1 connects to the receptacle 2 of the receiver aircraft. The end of the boom or nozzle 1 comprises latches 3 housed inside the nozzle 1, these latches 3 in turn comprising stops 4. Moreover, the receptacle 2 of the receiver aircraft comprises hydraulically operated latch-pins 5, these latch-pins 5 being intended to fix and lock the nozzle 1 of the telescopic boom by means of its latches 3.

Figure 2:
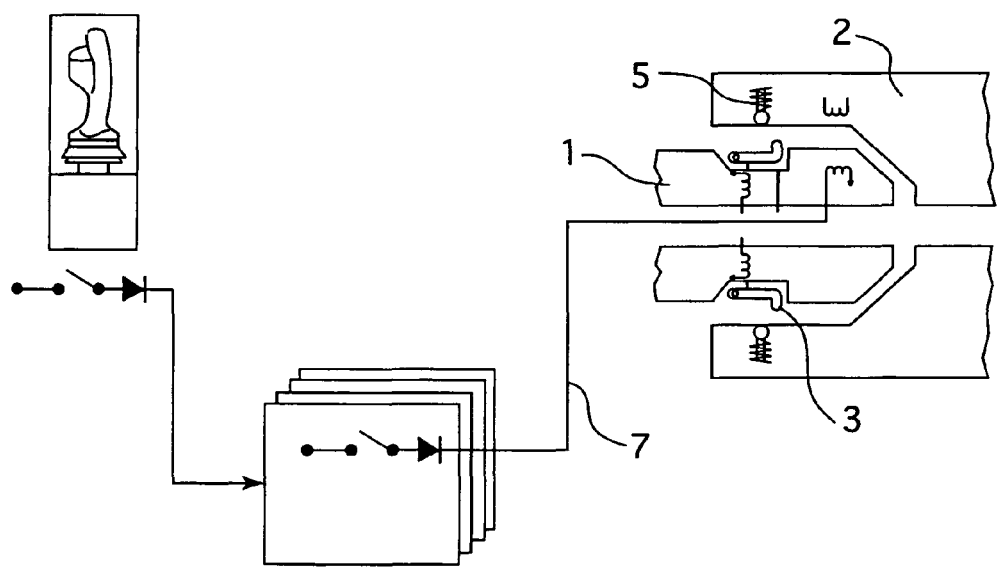
FIG. 2 shows in schematic form a normal disconnection system according to the known prior art, when the boom nozzle is released inside the receptacle and can start to be retracted.

Once refuelling has been completed, it is required to perform disconnection of the nozzle 1 from the receptacle 2, as shown in FIG. 2. This disconnection operation is performed by means of the boomer on the tanker aircraft who performs normal disconnection consisting in sending, by means of an electrical disconnection signal 7, a command to the latch-pins 5 of the receptacle 2 so that they release the latches 3 of the nozzle 1. The latch-pins 5 are thus retracted, releasing the latches 3 of the nozzle 1. The time required for the nozzle 1 to be fully released from the receptacle 2 varies depending on the type and the characteristics of the said receptacle 2. Until the nozzle 1 has been completely released, the boomer is unable to start retracting the telescopic boom.

Figure 3:
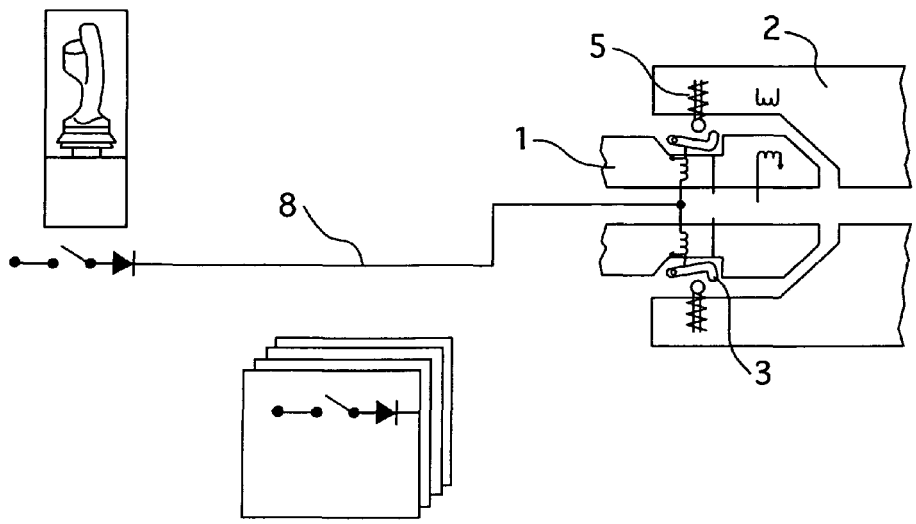
FIG. 3 shows in schematic form an emergency disconnection system according to the known prior art, when the boom nozzle is released inside the receptacle and can start to be retracted.

On occasions, as shown in FIG. 3, it is required to perform an emergency disconnection of the nozzle 1 from the receptacle 2, for example in cases where there is a fault affecting a certain component, either in the receptacle 2 or in the tanker equipment.

In such situations, according to the prior art, in addition to the normal disconnection system described above (FIG. 2), an emergency disconnection system is provided, these two disconnection systems being independent of each other. This emergency disconnection system allows the boomer of the tanker aircraft to extract the nozzle 1 from the receptacle 2 of the receiver aircraft. This emergency disconnection operation is performed by means of the boomer who, by means of an emergency electrical signal 8, effects the movement of the latches 3 of the nozzle 1 so that the nozzle 1 is released, even though the latch-pins 5 of the receptacle 2 have not moved, thereby allowing the boomer to start retracting the said boom.

As already mentioned, the present invention relates to a system 10 for performing the disconnection of a boom used for refuelling or fuel transfer, in particular a telescopic boom used for in-flight refuelling and fuel transfer between a tanker aircraft and a receiver aircraft. The system 10 according to the invention, as well as operation thereof, is illustrated in detail in FIGS. 4, 5 and 6.

The disconnection system 10 according to the invention in turn comprises:
 a normal disconnection system 20;
 an independent disconnection system 30, which operates in parallel with the normal disconnection system 20, being activated whenever the normal activation system 20 is activated; and
 an independent disconnection system 41, which operates directly and independently of the normal disconnection system 20 and the independent disconnection system 30.

The disconnection system 10 according to the invention operates the nozzle 1 of the telescopic boom for the transfer of fuel.

The telescopic boom operated by the system 10 according to the invention comprises a nozzle 1, with a housing 9 which in turn comprises undercuts 11 which receive latches 3 which have stops 4 at their ends closest to the receptacle 2 of the receiver aircraft. The latches 3, and consequently the undercuts 11 in the housing 9 of the nozzle 1, are situated diametrically opposite each other. Moreover, two solenoid systems, i.e. a primary solenoid system 13 and an independent solenoid system 14, are installed in the housing 9 of the nozzle 1.

Figure 4:
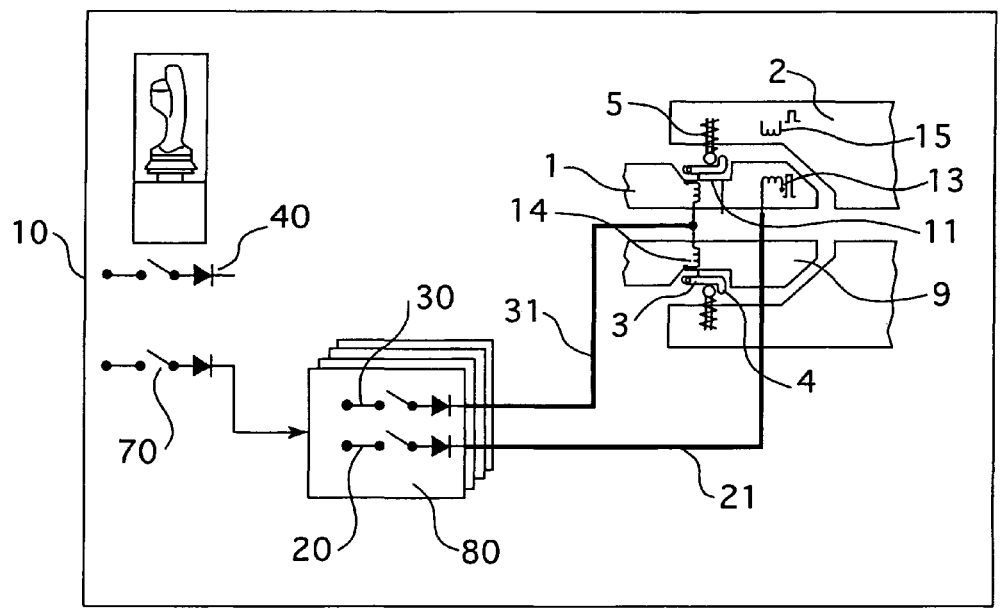
FIG. 4 shows in schematic form a disconnection system according to the invention, when the boom nozzle is engaged inside the receptacle.

In turn, the receptacle 2 of the receiver aircraft is provided with a secondary solenoid system 15 which comprises a secondary coil as well as latch-pins 5 which are intended to keep the latches 3 of the nozzle 1 locked and fixed by means of their stops 4, so that the nozzle 1 is correctly connected inside the receptacle 2, allowing fuel to be transferred from one aircraft to another, as shown in FIG. 4.

The system 10 comprises a receptacle disconnection system 20 which operates the latch-pins 5 of the receptacle 2 and a nozzle disconnection system 30 which operates the latches 3 of the nozzle 1 so that, when an operator performs normal disconnection of the nozzle 1, the system 10 sends a first signal 21 to the receptacle 2 so that its latch-pins 5 are retracted in order to release the latches 3 of the nozzle 1 and, in parallel, sends a second signal 31 to the nozzle 1 so that the latches 3 of the nozzle 1 are retracted and the said nozzle 1 is released.

As shown in FIG. 4, the system 10 comprises two switches which are controlled by the operator or boomer, a normal disconnection switch 70 by means of which the operator performs normal disconnection, and an independent disconnection switch 40 by means of which the operator performs an independent disconnection. The normal disconnection is performed by means of a computerized control unit 80 which sends the aforementioned receptacle disconnection signal 21 and nozzle disconnection signal 31.

Figure 5:
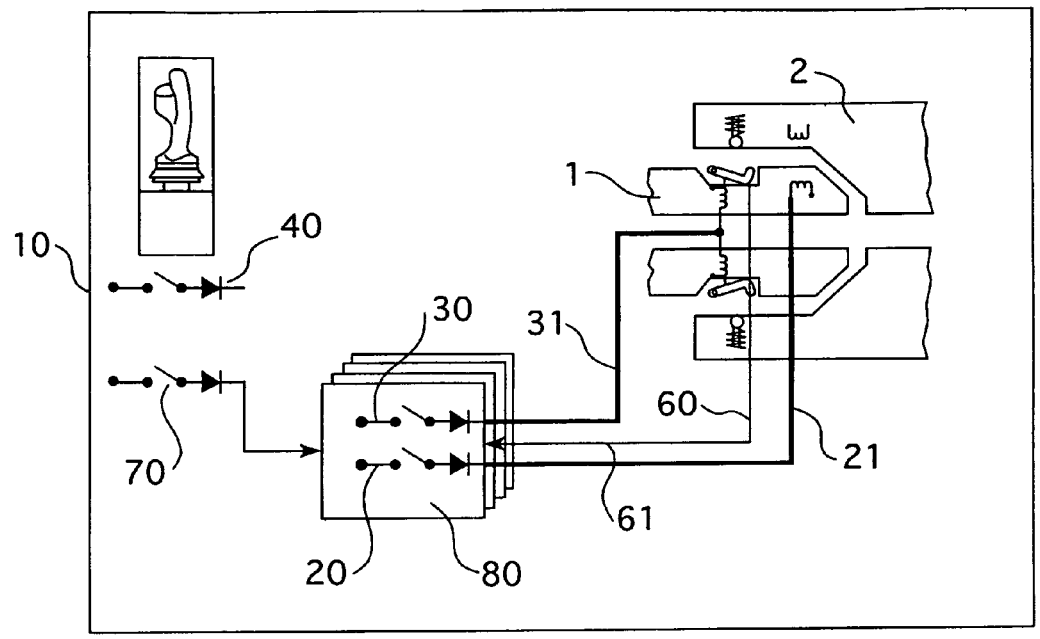
FIG. 5 shows in schematic form a disconnection system according to the invention, when the boom nozzle is released inside the receptacle and can start to be retracted, following normal disconnection of the nozzle by the boomer.

As shown in FIGS. 4 and 5, when the boomer performs normal disconnection of the nozzle 1, closing the normal disconnection switch 70, on the one hand an electrical signal 21 for receptacle disconnection is sent to the primary solenoid system 13 of the nozzle 1, this primary solenoid system 13 comprising a primary coil which, when passed through by this electric current, creates a magnetic field which induces a current in the secondary coil of the secondary solenoid system 15 of the receptacle 2 of the receiver aircraft; when current is induced in this secondary coil, the receptacle 2 starts to move its latch-pins 5 which therefore start to release the latches 3 of the nozzle 1 (FIG. 5).

Moreover, in parallel with that described above, when the boomer performs normal disconnection, closing the normal disconnection switch 70, an electrical signal 31 for nozzle disconnection is sent at the same time to the independent solenoid system 14 of the nozzle 1. When this solenoid system 14 is excited, the latches 3 of the nozzle are then operated so that they start to retract inside the undercuts 11 of the housing 9 of the boom which are provided for this purpose, thereby starting to release the nozzle 1 (FIG. 5). Since the electrical signal 31 for nozzle disconnection is sent directly to the nozzle 1, it starts to operate more rapidly the nozzle disconnection system 30 than the receptacle disconnection system 20 so that the latches 3 of the nozzle 1 start to be retracted before the latch-pins 5 of the receptacle 2.

As can be seen in FIG. 5, when both the receptacle disconnection system 20 and the nozzle disconnection system 30 are operated in parallel, the response time achieved according to the invention is much shorter than that of the known systems, the nozzle 1 being able to start retraction with the latches 3 and the latch-pins 5 positioned as shown in FIG. 5, where the latch-pins 5 of the receptacle 2 are not yet fully retracted.

With the system according to the invention, disconnection of the nozzle 1 from the receptacle 2 is performed much more safely than in the known systems since it is achieved by means of two systems, i.e. a receptacle disconnection system 20 and a nozzle disconnection system 30, these two systems 20 and 30 operating furthermore two different components within the system, i.e. the nozzle 1 on the one hand and the receptacle 2 on the other hand. The dual system consequently ensures a very high level of safety of the disconnection system 10 according to the invention.

Figure 6:
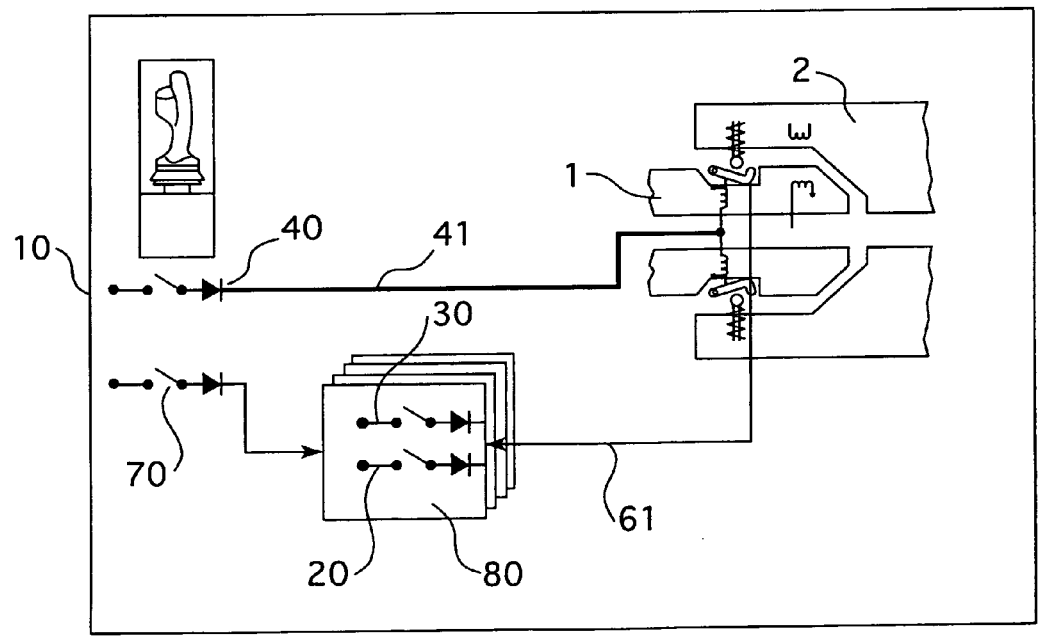
FIG. 6 shows in schematic form a disconnection system according to the invention, when the boom nozzle is released inside the receptacle and can start to be retracted, following independent disconnection of the nozzle by the boomer.

Moreover, the disconnection system according to the invention also comprises an independent disconnection system 41 (FIG. 6) which is closed by operating the independent disconnection switch 40. The independent disconnection system 41 is independent of the receptacle disconnection system 20 and the nozzle disconnection system 30 which are activated by closing the normal disconnection switch 70. Thus, by means of this independent disconnection system 41, the boomer is able to perform, at any moment and directly (without the aid of the computerized control unit 80), disconnection and consequently independent retraction of the nozzle 1, as shown in FIG. 6. When the boomer performs an independent disconnection, operating the independent disconnection system 41, an independent electrical signal is sent directly to the independent solenoid system 14 of the nozzle 1. When this system 14 is excited, the latches 3 of the nozzle 1 are then moved and are retracted into the undercuts 11 in the housing 9 of the boom which are provided for this purpose, thereby releasing the nozzle 1 so that it can be safely disconnected from the receptacle 2.

The disconnection system 10 according to the invention in turn comprises a fault detection system which detects possible faults when the disconnection system is operated, checking that the system 10 is operative. Preferably, the system 10 checks permanently that the receptacle disconnection system 20 is operative.

When the boomer performs normal disconnection, closing the normal disconnection switch 70, since the receptacle disconnection system 20 and the nozzle disconnection system 30 operate in parallel, it could happen that there is a fault in the receptacle disconnection system 20 which remains hidden and permanently undetected, since the nozzle disconnection system 30 has been operated in parallel and would have released the latches 3 of the nozzle 1, allowing it to be extracted from the receptacle 2. In this case, owing to the rapid operation of the nozzle disconnection system 30, disconnection of the nozzle 1 would be performed very rapidly, but the system 10 would have lost its dual safety feature. These faults are called "hidden faults". Consequently, the disconnection system 10 according to the invention also comprises a fault detection system which permanently checks that the entire disconnection system 10 is operative. According to a preferred embodiment of the invention, the fault detection system checks that the receptacle disconnection system 20 is operative. More particularly, the fault detection system permanently checks that the line for the receptacle disconnection signal 21 connecting the system 10 and the primary solenoid system 13 of the nozzle 1—which together with the secondary solenoid system 15 opens the latch-pins 5 of the receptacle 2—is functioning correctly, detecting for the presence of any faults at any point along the receptacle disconnection system 20 as far as the primary solenoid system 13.

Furthermore, the disconnection system 10 according to the invention comprises a disconnection sensor 60 which indicates whether the nozzle 1 is free inside the receptacle 2 and can be automatically retracted in a safe manner. This disconnection sensor 60, which is arranged in the nozzle 1, is able to send a disconnection signal 61 to the computerized control unit 80 so as to perform automatic retraction of the nozzle 1.

Thus, in accordance with the description provided above, the main characteristic features of the invention are as follows:
- the disconnection system 10 comprises a disconnection sensor 60 which ensures that the nozzle 1 is released from the receptacle 2;
- the nozzle disconnection system 30 is operated automatically and in parallel with the receptacle disconnection system 20 whenever the boomer performs normal disconnection of the nozzle 1;
- the disconnection system 10 comprises a fault detection system for detecting possible hidden faults in the disconnection system 10;
- the disconnection system 10 according to the invention is connected to the computerized control unit 80 of the boom so that, when the disconnection sensor 60 indicates that the nozzle 1 is free inside the receptacle 2, automatic retraction of said nozzle 1 is performed; and
- there is still the possibility for the boomer to perform independent retraction of the nozzle 1 by means of the independent disconnection system 41, in which case the signal reaches the nozzle 1 via an independent and direct path, without passing via intermediate components such as a computer.

Moreover, the main advantages of the disconnection system 10 according to the present invention which arise from its characteristic features described above are as follows:
- the disconnection sensor 60 is able to ensure that the nozzle 1 is fully released from the receptacle 2 and may therefore start to be retracted;
- the response time of the disconnection system operated by the receptacle disconnection system 20 and the nozzle disconnection system 30 in parallel is shorter than the disconnection time in the case where only the receptacle disconnection system 20 is operated, being moreover independent of the type of receptacle 2; this means that it is not required to wait for complete opening of the latch-pins 5 of the receptacle 2 in order to start performing retraction of the nozzle 1, this increasing significantly the safety of this operation;
- since the nozzle disconnection system 30 and the receptacle disconnection system 20 are always operated in parallel, it could happen that a fault in the receptacle disconnection system 20 remains hidden until a fault in the nozzle disconnection system 30 occurs during an operation involving normal disconnection of the nozzle 1; in the system according to the invention, however, a fault detection system is provided for checking and permanently monitoring that the entire disconnection system 10 is operative; and
- since the system 10 according to the invention comprises a disconnection sensor 60, a means is provided for indicating that the nozzle 1 is released from the receptacle 2 so that automatic retraction of the boom can be started, improving its response time and increasing the safety of the operation.

Although the present invention has been described entirely in connection with preferred embodiments, it is evident that it may be subject to those modifications which lie within the scope of the following claims, without said scope being regarded as limited by the above embodiments.

The invention claimed is:

1. A system (10) for disconnecting the nozzle (1) of a boom from a receptacle (2) to which the nozzle (1) is connected for fuel transfer, comprising latches (3) which are situated in the nozzle (1) and which engage with latch-pins (5) arranged in the receptacle (2), characterized in that the system (10) comprises a receptacle disconnection system (20) which operates the latch-pins (5) of the receptacle (2) and a nozzle disconnection system (30) which operates the latches (3) of the nozzle (1) such that, when an operator performs normal disconnection of the nozzle (1), the system (10) sends a first signal (21) to the receptacle (2) so that the latch-pins (5) are retracted in order to release the latches (3) of the nozzle (1) and, in parallel, sends a second signal (31) to the nozzle (1) so that the latches (3) of the nozzle (1) are retracted and release the said nozzle (1)), and the nozzle disconnect system (30)

and the receptacle disconnect system (20) being arranged such that the response time of the nozzle disconnect system (30) is shorter than that of the receptacle disconnect system (20) whereby the nozzle (1) retraction is able to be started where the latch-pins (5) are not yet fully retracted.

2. The system (10) according to claim 1, further comprising two switches controlled by the operator, a first switch including a normal disconnection switch (70) by means of which the operator performs normal disconnection and a second switch including an independent disconnection switch (40) by means of which the operator performs independent disconnection.

3. The system (10) according to claim 1, in which normal disconnection of the nozzle (1) is performed by means of a computerized control unit (80) which sends the receptacle disconnection signal (21) and the nozzle disconnection signal (31).

4. The system (10) according to claim 1, in which the receptacle disconnection system (20) moves the latch-pins (5) of the receptacle (2) by means of a primary solenoid electrical system (13).

5. The system (10) according to claim 1, in which the nozzle disconnection system (30) moves the latches (3) by means of an independent solenoid system (14).

6. The system (10) according to claim 1, further comprising a disconnection sensor (60) which indicates whether the nozzle (1) is released inside the receptacle (2).

7. The system according to claim 6, further comprising a computerized control unit (80), and wherein the disconnection sensor (60) sends a signal (61) to the computerized control unit (80) in order to perform automatic retraction of the nozzle (1).

8. The system (10) according to claim 1, further comprising an independent disconnection system (41) which performs directly and independently of the normal disconnection of the nozzle (1), causing directly the movement of the latches (3) of the nozzle (1), which are retracted and allowing disconnection of the nozzle (1) from the receptacle (2).

9. The system (10) according to claim 1, further comprising a fault detection system which detects possible faults when the disconnection system (10) is operated, checking that the disconnection system (10) is operative.

10. The system (10) according to claim 9, in which the fault detection system checks permanently that the receptacle disconnection system (20) is operative.

11. The system (10) according to claim 1, in which the nozzle (1) is situated in a telescopic boom for in-flight fuel transfer and the receptacle (2) is situated in a receiver aircraft.

12. A tanker aircraft comprising a disconnection system (10) according to claim 1 for the nozzle (1) of the telescopic boom which the tanker aircraft uses for in-flight transfer of fuel to a receptacle (2) arranged in a receiver aircraft.

* * * * *